(12) United States Patent
Razoumov et al.

(10) Patent No.: US 9,026,137 B2
(45) Date of Patent: May 5, 2015

(54) DETERMINING A LOCATION OF A WIRELESS ENDPOINT DEVICE IN A WIRELESS NETWORK

(71) Applicant: AT&T Intellectual Property I, L.P., Atlanta, GA (US)

(72) Inventors: Leonid Razoumov, Riverdale, NY (US); Robert Raymond Miller, II, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 13/715,833

(22) Filed: Dec. 14, 2012

(65) Prior Publication Data
US 2014/0171101 A1   Jun. 19, 2014

(51) Int. Cl.
*H04W 24/00* (2009.01)
(52) U.S. Cl.
CPC ..................................... *H04W 24/00* (2013.01)

(58) Field of Classification Search
None
See application file for complete search history.

(56) References Cited

U.S. PATENT DOCUMENTS

| | | |
|---|---|---|
| 6,249,680 B1 * | 6/2001 | Wax et al. .................. 455/456.2 |
| 2001/0035841 A1 * | 11/2001 | Porcino ......................... 342/387 |
| 2003/0054845 A1 * | 3/2003 | Krasny et al. ................. 455/506 |
| 2010/0195566 A1 * | 8/2010 | Krishnamurthy et al. .... 370/328 |
| 2010/0331009 A1 * | 12/2010 | Krishnamurthy et al. . 455/456.1 |

* cited by examiner

*Primary Examiner* — Erika A Washington

(57) ABSTRACT

A method, computer readable medium and apparatus for determining a location of a user endpoint device in a wireless network are disclosed. For example, the method receives from each of a plurality of base stations a plurality of signals and a plurality of times of arrival, wherein each of the plurality of times of arrival is associated with a particular signal of the plurality of signals, and determines the location of the wireless endpoint device from the plurality of signals and the plurality of times of arrival.

18 Claims, 4 Drawing Sheets

Figure 1:
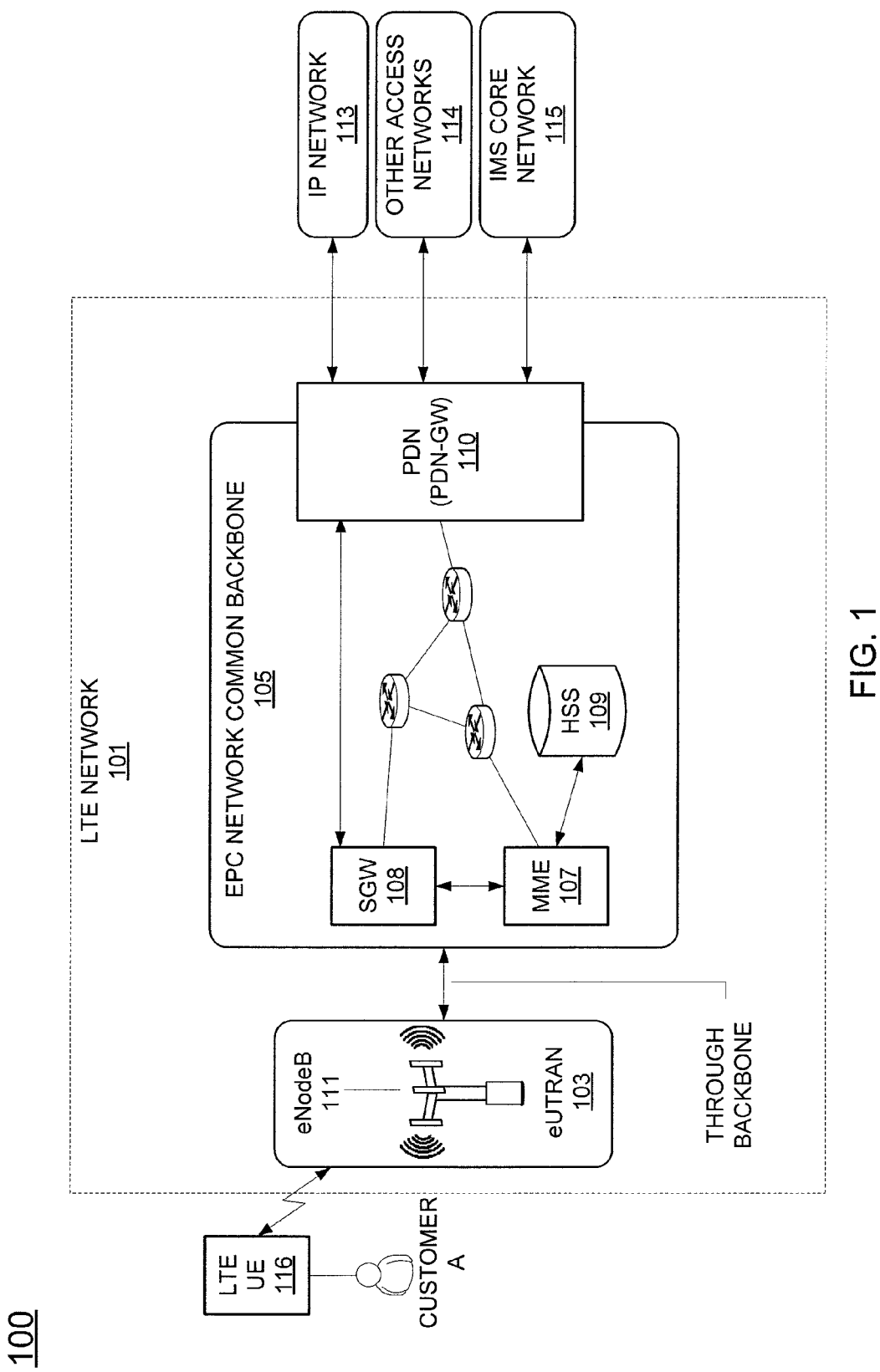

DETERMINING A LOCATION OF A WIRELESS ENDPOINT DEVICE IN A WIRELESS NETWORK

The present disclosure relates generally to communication networks and, more particularly, to a method, computer readable medium and apparatus for determining a location of a wireless endpoint device in a wireless network, e.g., in a cellular network such as an LTE (long term evolution) wireless network and the like.

BACKGROUND

More and more customers are using wireless endpoint devices to access or utilize various services. For example, a customer may use a cellular (cell) phone for accessing communications services, making purchases, conducting banking transactions, accessing various multimedia services, etc.

However, some services require an accurate knowledge of a location of the wireless endpoint device. However, the location of the wireless endpoint device may not be available or may be inaccurate. For example, when a cell phone is indoors or in a city with high-rise buildings, Global Positioning System (GPS) information for the cell phone may not be readily available or may be inaccurate. In addition, in some instances, a wireless service provider may be constrained or entirely prohibited from using the GPS information of the cell phone for providing a service.

SUMMARY OF THE DISCLOSURE

In one embodiment, the present disclosure teaches a method, computer readable medium and apparatus for determining a location of a user endpoint device in a wireless network. For example, the method receives from each of a plurality of base stations a plurality of signals and a plurality of times of arrival, wherein each of the plurality of times of arrival is associated with a particular signal of the plurality of signals, and determines the location of the wireless endpoint device from the plurality of signals and the plurality of times of arrival.

BRIEF DESCRIPTION OF THE DRAWINGS

The teaching of the present disclosure can be readily understood by considering the following detailed description in conjunction with the accompanying drawings, in which:

FIG. 1 is a block diagram depicting an illustrative network related to the current disclosure;

FIG. 2 illustrates an exemplary network in accordance with one embodiment of the current disclosure for determining a location of a wireless endpoint device;

FIG. 3 illustrates a flowchart of a method for determining a location of a wireless endpoint device;

FIG. 4 illustrates a flowchart of a method for determining a location of a user endpoint device from the plurality of signals and the plurality of times of arrival; and FIG. 5 depicts a high-level block diagram of a general-purpose computer suitable for use in performing the functions described herein.

To facilitate understanding, identical reference numerals have been used, where possible, to designate identical elements that are common to the figures.

DETAILED DESCRIPTION

The present disclosure broadly teaches a method, computer readable medium and apparatus for determining a location of a wireless endpoint device, e.g., in a wireless network such as an LTE wireless network and the like. Although the teachings of the present disclosure are discussed below in the context of an LTE wireless network, the teaching is not so limited. Namely, the teachings of the present disclosure can be applied for other types of wireless networks, wherein locating a user endpoint device is beneficial for providing services to the customers of a wireless service provider.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE standard is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

A base station for a 2G network is also referred to as a base transceiver station (BTS). A base station in a 3G network is also referred to as a Node B. For the 4G network, a radio base transceiver station (RBS), as per the 3GPP standards, is referred to as an eNodeB (or simply as a base station). An eNodeB provides an LTE—air interface and performs radio resource management for wireless access.

FIG. 1 illustrates an exemplary network 100 related to the present disclosure. In one illustrative embodiment, the network 100 comprises an LTE network 101, an IP network 113, other access networks 114, an IP Multimedia Subsystem (IMS) core network 115, and an LTE user endpoint device 116. The user endpoint device 116 can be a smart phone, a cellular phone, a computer or laptop, a computing tablet, or any endpoint communication devices equipped with wireless capabilities.

In one embodiment, the LTE network 101 comprises access network 103 and a core network 105. In one example, the access network 103 comprises an evolved Universal Terrestrial Radio Access Network (eUTRAN). In one example, the core network 105 comprises an Evolved Packet Core (EPC) network. The eUTRANs are the air interfaces of the 3GPP's LTE specifications for mobile networks. Namely, the eUTRAN comprises a radio access network standard that replaces previous generations of air interface standards. All eNodeBs in the eUTRAN 103 are in communication with the EPC network 105. In operation, LTE user equipment or user endpoints (UE) 116 may access wireless services via the eNodeB 111 located in the eUTRAN 103. It should be noted that any number of eNodeBs can be deployed in an eUTRAN. In one illustrative example, the eUTRAN 103 may comprise one or more eNodeBs.

An EPC network provides various functions that support wireless services in the LTE environment. In one embodiment, an EPC network is an Internet Protocol (IP) packet core network that supports both real-time and non-real-time service delivery across a LTE network, e.g., as specified by the 3GPP standards. For example, in EPC network 105, network devices Mobility Management Entity (MME) 107 and Serving Gateway (SGW) 108 support various functions as part of the LTE network 100. MME 107 is the control node for the LTE access-network. In one embodiment, the MME 107 is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a Public Data Network (PDN) gateway (GW) 110 which serves as a gateway that provides access between the EPC network 105 and various data networks, e.g., other IP networks 113, an IMS core network 115, other access networks 114 and the like. In one embodiment, the EPC network 105 may also comprise a Policy Charging and Rule Function (PCRF) that supports accesses to subscriber databases and specialized functions of a charging system. The Policy Charging and Rule Function (PCRF) can be implemented as a standalone module or implemented as a part of one of the other network modules of the EPC network 105.

It should be noted that the EPC network 105 as shown in FIG. 1 is only illustrative and is not limited to the network elements as described above, i.e., there could be additional network elements that are deployed but not discussed.

It should be noted that although various networks are shown as separate networks in FIG. 1, it is possible that functions or operations performed by these networks can be combined into fewer networks or expanded into a greater number of networks depending on the deployment requirements.

It should also be noted that the above illustrated network 100 is only illustrative and the number of network components or elements are not specifically limited as shown. Any number of network components or elements can be deployed.

As the use of wireless technology grows, more and more customers are using wireless endpoint devices to access or utilize various services. For example, a customer may use a smart phone for accessing communications services, perform financial transactions, etc. However, providing a service to the customer may require an accurate knowledge of the location of the customer's wireless endpoint device through which the customer is accessing the service. However, obtaining the exact location of the wireless endpoint device may not be readily possible. For example, when a cell phone is indoors or in a city with high-rise buildings, GPS information for the phone may not be readily available. In addition, in some instances the wireless service provider may be legally prohibited from using the GPS information of the cell phone for providing a particular service.

A wireless service provider may wish to provide a service via an LTE (long term evolution) network. Unlike universal mobile telecommunication systems (UMTSs) and wideband code division multiple access (WCDMA) systems that have a fixed bandwidth of 5 MHz, LTE (long term evolution) provides a plurality of bandwidth options. For example, an LTE network may have a plurality of bandwidth options that comprise at least one of: 1.4 MHz, 3 MHz, 5 MHz, 10 MHz, 15 MHz and 20 MHz. Due to the availability of several bandwidth options, LTE networks have gained popularity.

However, LTE networks use an Orthogonal Frequency-Division Multiplexing (OFDM) scheme. In OFDM, a plurality of orthogonal sub-carrier signals is used to carry data on a plurality of parallel channels. The plurality of sub-carrier signals are closely spaced and are chosen such that the sub-carriers are orthogonal to each other. The usage of orthogonal sub-carrier signals reduces or eliminates cross-talk between the channels. The OFDM scheme enables a transmitter to transmit data as a plurality of low-rate parallel streams, instead of as one high-rate data stream. Consequently, data transported using OFDM is less affected by multipath propagation as compared to data transported using a single high-rate data streaming scheme. In OFDM, signals received from multiple transmitters may be constructively combined.

In one example, when a user endpoint device approaches a particular physical location, a receiver at an adjacent eNodeB (a base station of an LTE network) may receive a plurality of signals from the user endpoint device. For example, the receiver may receive a signal via a direct path between the user endpoint device and the eNodeB and any number of signals via indirect paths. The direct path is the shortest path between the user endpoint device and the eNodeB. The direct path is the path most closely related to the geometrical positioning of the transmitters and receivers. The signals received via indirect paths may be due to reflections that occur on surfaces of various structures such as large natural terrains or man-made structures. The signals received via the indirect paths are received as several multipath components. Thus, the receiver antenna of an eNodeB may receive multiple copies of the same signal at the same frequency transmitted by a wireless endpoint device. The multiple copies that are received may be constructively combined. Similarly, the wireless endpoint device may receive a signal via a direct path between the wireless endpoint device and the eNodeB, and any number of signals via indirect paths.

Since the OFDM signals are less affected by the particular path that the OFDM signal traverses, the receiver may be unable to distinguish among various copies of a same signal received via different paths. As such, the receiver may not be able to ascertain an accurate time of arrival for a user endpoint device at a particular location. In one embodiment, the present disclosure provides a method for determining the location of the wireless user endpoint device solely from information collected from base stations, e.g., from eNodeBs.

In one embodiment, the present disclosure provides an overlay Location Channel (LOCH). The LOCH channel has low power and is spread uniformly across the entire bandwidth. The signal carried on the LOCH comprises a known periodic sequence with a constant envelope and perfect autocorrelation properties. In one embodiment, the signal carried on the LOCH channel comprises a signal to which a Zadoff-Chu sequence is applied. When the Zadoff-Chu sequence is applied to the signals, the resulting signal has a property wherein cyclically shifted versions of the signal are orthogonal to each other.

The LOCH channel is overlaid onto an LTE signal. For example, an LTE signal is first encoded and modulated. Then, a LOCH channel, carrying a signal with a known periodic sequence with a constant envelope and perfect autocorrelation properties, is overlaid onto the LTE signal. The combined signal is then transmitted towards a receiver.

As described above, the signal carried on the LOCH comprises a known periodic sequence with low power. Thus, the receiver is able to extract the signal carried on the LOCH prior to performing demodulation and data decoding, without negatively affecting the performance of the receiver.

As noted above, the receiver may receive a plurality of signals via a plurality of paths. For instance, the receiver may receive one signal via a direct path and any number of signals via indirect paths. The receiver then records a time of arrival for each of the plurality of signals that are received.

The receiver then extracts the overlaid LOCH from each of the plurality of signals received. Once the LOCH is extracted, the remaining signal (LTE signal) may be processed using a normal procedure. For example, the demodulation and decoding of the LTE signal may proceed using the normal procedure. The content of the LOCH that is extracted is then provided to a Mobility Management Entity (MME). The MME gathers signals carried on LOCHs and their respective times of arrival. The MME then processes the content of each LOCH to determine the location of the transmitter that transmitted the content towards the receiver. For the example above, the signal carried on the LOCH may be processed by an MME to determine a location of the user endpoint device that transmitted the signal towards the eNodeB.

The MME then identifies a string of multipath components of the signal carried on the LOCH. For example, using the perfect auto-correlation properties of the signal carried on the LOCH, the MME is able to identify the string of multipath components in the signal carried on the LOCH.

The MME then determines an earliest time of arrival of a signal from a transmitter in accordance with the times of arrival that are collected from receivers. The earliest time of arrival is a time at which an earliest arrival instance of a component of the string of multipath components of the signal carried on the LOCH is received by an eNodeB.

The method then determines a location of a transmitter in accordance with the earliest time of arrival that is determined. If the transmitter is a transmitter of the user's wireless endpoint device, the location of the transmitter is then the location of the user's wireless endpoint device. The service provider may then provide a service using the location of the user's wireless endpoint device that is determined by the MME, solely based on information collected from base stations, e.g., from eNodeBs. For example, if the wireless endpoint device is at a particular location and the location is needed to provide a service (e.g., a navigation service), the service provider is able to use the location that is determined for providing such service.

Figure 2:
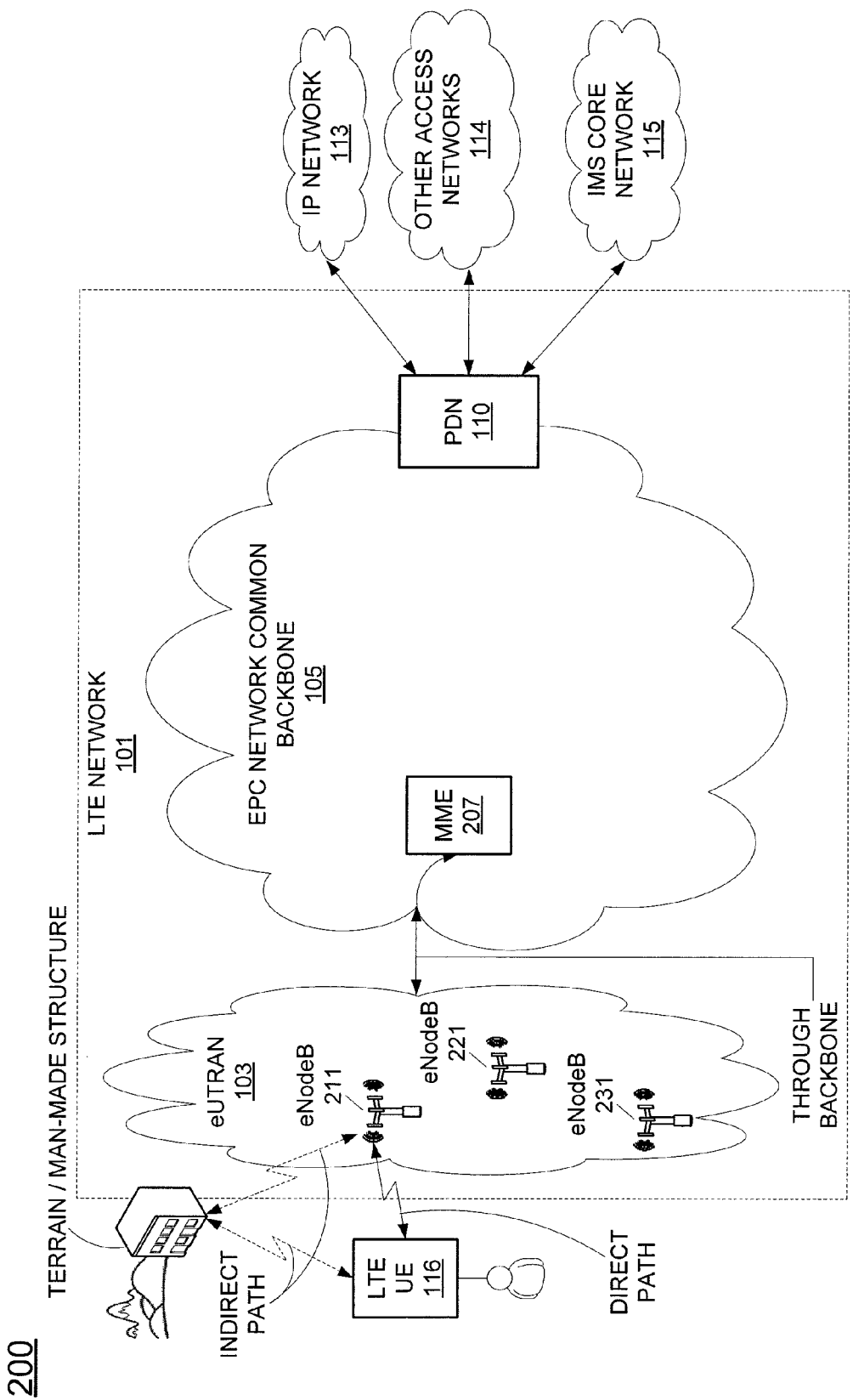

FIG. 2 illustrates an exemplary network 200 in accordance with one embodiment of the current disclosure for determining a location of a user's wireless endpoint device. The service provider may implement the method of the present disclosure for determining a location of a user's wireless endpoint device via a Mobility Management Entity (MME). The MME collects information from base stations, e.g., eNodeBs. A network service provider may provide to a customer a wireless endpoint device with a capability to overlay a location channel onto a signal of a long term evolution (LTE) network, prior to transmitting a signal towards a receiver of a base station. The location channel carries a signal with a known periodic sequence with a constant envelope and perfect autocorrelation properties. The service provider may then enable receivers of base stations to provide to an MME: the content of each LOCH that is extracted and their respective times of arrival. The MME then receives and processes the content of each LOCH times of arrivals to determine the location of the transmitter that transmitted the content towards the receiver. For example, a signal carried on the LOCH may be processed by an MME to determine a location of a user endpoint device that transmitted the signal towards an eNodeB.

The network 200 comprises the LTE network 101, the IP network 113, other access networks 114, the IP Multimedia Subsystem (IMS) core network 115, and an LTE user endpoint device 116. The LTE network 101 comprises an access network 103 and a core network 105. In one example, the access network 103 comprises an eUTRAN. The core network 105 comprises an Evolved Packet Core (EPC) network. The LTE user endpoint device 116 may access wireless services via an eNodeB 211, an eNodeB 221 or an eNodeB 231. All eNodeBs in the eUTRAN 103 are in communication with the EPC network 105. The EPC network 105 provides various functions that support wireless services in the LTE environment. The EPC network 105 comprises an MME 207. The MME 207 is the control node for the LTE access-network 101.

The service provider may implement the method of the present disclosure for determining a location of a user endpoint device via the MME 207. A network service provider may provide to a customer a wireless user endpoint device (UE) 116. The UE 116 has a capability to overlay a location channel onto a signal of a long term evolution (LTE) network, prior to transmitting a signal towards a receiver of a base station. The location channel carries a signal with a known periodic sequence with a constant envelope and perfect auto-correlation properties.

The service provider may then enable receivers of eNodeBs 211, 221 and 231 to provide to the MME 207: the content of each LOCH that is extracted and their respective times of arrival. The MME 207 collects information from base stations, e.g., eNodeBs 211, 221 and 231. For example, a signal carried on the LOCH may be sent from eNodeB 211 to the MME 207.

The MME 207 then receives and processes the content of each LOCH and corresponding times of arrivals to determine the location of the transmitter that transmitted the signal towards the particular eNodeB. For the example above, the signal received (from the UE) by the eNodeB via each LOCH is forwarded by the eNodeB towards the MME 207. The forwarding is performed such that the signal may be processed to determine the location of the UE. In one embodiment, the processing is performed by first identifying a string of multipath components of the signal transmitted on the LOCH from the UE to the eNodeB. The MME then determines an earliest time of arrival of a signal from a transmitter in accordance with the times of arrival that are collected from the eNodeB. The earliest time of arrival is a time at which an earliest arrival instance of a component of the string of multipath components of the signal carried on the LOCH is received by the eNodeB. The MME then determines a location of the UE that transmitted the signal to the eNodeB in accordance with the earliest time of arrival that is determined.

Figure 3:
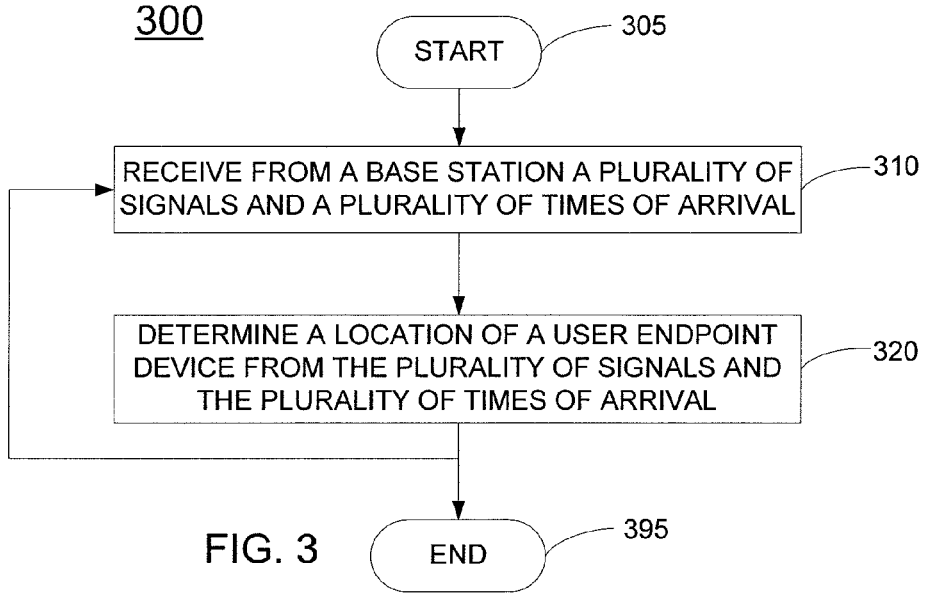

FIG. 3 illustrates a flowchart of a method 300 for determining a location of a wireless endpoint device. In one embodiment, method 300 may be implemented in a network element of a wireless network. For example, the network element of the wireless network may be a Mobility Management Entity (MME) as illustrated in FIG. 2. Method 300 starts in step 305 and proceeds to step 310.

In step 310, method 300 receives from each of a plurality of base stations a plurality of signals and a plurality of times of arrival, wherein each of the plurality of times of arrival is associated with a particular signal of the plurality of signals. For example, an MME may receive a plurality of signals from each of the base stations. For example, a signal may be transmitted on a location channel from a user endpoint device to any number of base stations. A particular base station of the plurality of base stations may receive a plurality of signals from the user endpoint device via a plurality of paths. Each of the plurality of signals that is received via a particular path of the plurality of paths may then be extracted by the particular base station and forwarded to the MME for analysis.

In step 320, method 300 determines a location of a user endpoint device from the plurality of signals and the plurality of times of arrival received from the plurality of base stations. For example, the method determines an earliest time of arrival in accordance with the times of arrival that are collected. The earliest time of arrival is a time at which an earliest arrival instance of a component of the string of multipath components of the signal carried on the LOCH is received by a base station of the plurality of base stations, e.g. a particular eNodeB of a plurality of eNodeBs that may have forwarded a signal to an MME. The method then determines a location of a wireless endpoint device in accordance with the earliest time of arrival that is determined. The method then either proceeds to step 310 to receive more signals or to step 395 to end the process.

It should be noted that each base station may receive a plurality of signals via a plurality of paths. Each particular base station records a time of arrival for each of the plurality of signals that is received. The particular base station then extracts the overlaid location channel from each of the plurality of signals that is received. Once the location channel is extracted, the remaining signals (received via the plurality of paths) are processed using a normal procedure. For example, the demodulation and decoding of the LTE signal, described above, may proceed using the normal procedure. The content of the location channel that is extracted from each signal is then provided to the MME. The MME may then perform method 300, as described above.

Figure 4:
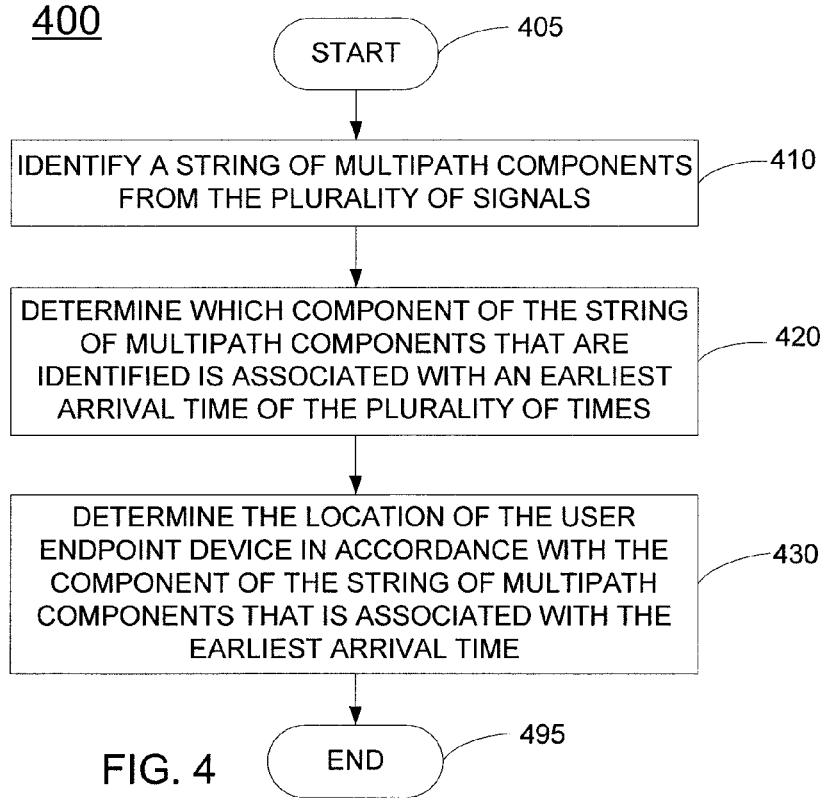

FIG. 4 illustrates a flowchart of step 320 of FIG. 3 in greater detail as method 400. Specifically, in step 410, the method 400 identifies a string of multipath components from the plurality of signals. In step 420, the method 400 determines which component of the string of multipath components that are identified is associated with an earliest arrival time of the plurality of times. Finally, in step 430, the method 400 determines the location of the user endpoint device in accordance with the component of the string of multipath components that is associated with the earliest arrival time. The method then ends in step 495.

It should be noted that although not specifically specified, one or more steps or operations of methods 300 and 400 may include a storing, displaying and/or outputting step as required for a particular application. In other words, any data, records, fields, and/or intermediate results discussed in the method can be stored, displayed and/or outputted to another device as required for a particular application. Furthermore, steps, blocks, or operations in FIGS. 3 and 4 that recite a determining operation or involve a decision do not necessarily require that both branches of the determining operation be practiced. In other words, one of the branches of the determining operation can be deemed as an optional step.

Figure 5:
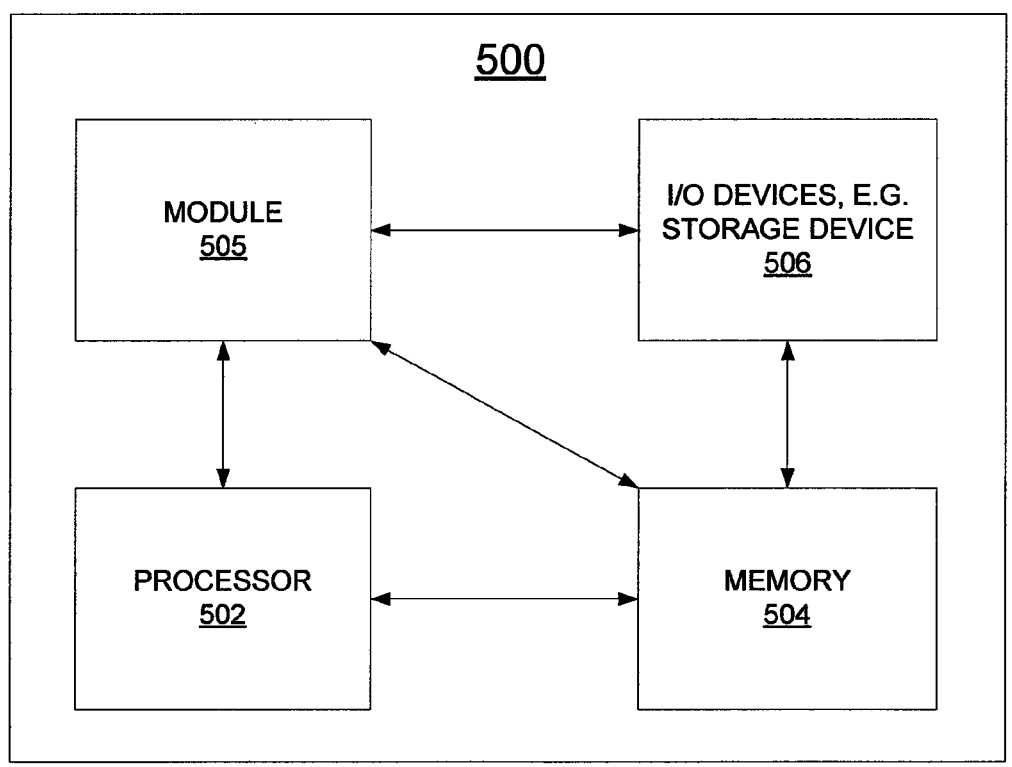

FIG. 5 depicts a high level block diagram of a general purpose computer or system suitable for use in performing the functions described herein. For example, any one or more components or devices illustrated in FIG. 1 or described in connection with the methods 300 and 400 may be implemented as the system 500. As depicted in FIG. 5, the system 500 comprises a hardware processor element 502 (e.g., a microprocessor, a central processing unit (CPU) and the like), a memory 504, (e.g., random access memory (RAM), read only memory (ROM) a disk drive, an optical drive, a magnetic drive, and/or a Universal Serial Bus (USB) drive), a module 505 for determining a location of a wireless endpoint device in a wireless network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that embodiments of the present disclosure can be implemented in software and/or in a combination of software and hardware, e.g., using application specific integrated circuits (ASIC), a general purpose computer or any other hardware equivalents, e.g., computer readable instructions pertaining to the methods discussed above can be used to configure a hardware processor to perform the steps, functions and/or operations of the above disclosed methods. In one embodiment, the present module or process 505 for determining a location of a wireless endpoint device in a wireless network can be implemented as computer-executable instructions (e.g., a software program comprising computer-executable instructions) and loaded into memory 604 and executed by hardware processor 502 to implement the functions as discussed above in connection with the exemplary methods 300 and 400 respectively. As such, the present module or process 505 for determining a location of a wireless endpoint device in a wireless network as discussed above in respective methods 300 and/or 400 (including associated data structures) can be stored on a non-transitory (e.g., tangible or physical) computer readable storage medium, e.g., RAM memory, magnetic or optical drive or diskette and the like.

It should be noted that the hardware processor can be configured or programmed to cause other devices to perform one or more operations as discussed above. In other words, the hardware processor may serve the function of a central controller directing other devices to perform the one or more operations as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a location of a wireless endpoint device in a wireless network, comprising:

receiving, via a processor of a network element of the wireless network, from each of a plurality of base stations a plurality of signals and a plurality of times of arrival, wherein each of the plurality of times of arrival is associated with a particular signal of the plurality of signals, wherein each base station of the plurality of base stations is for receiving each of the plurality of signals from the wireless endpoint device via a location channel; and determining, via the processor, the location of the wireless endpoint device from the plurality of signals and the plurality of times of arrival.

2. The method of claim 1, wherein the determining the location of the wireless endpoint device comprises:

identifying a string of multipath components from the plurality of signals;

determining which multipath component of the string of multipath components that are identified is associated with an earliest time of arrival of the plurality of times of arrival; and determining the location of the wireless endpoint device in accordance with the multipath component of the string of multipath components that is associated with the earliest time of arrival of the plurality of times of arrival.

3. The method of claim 1, wherein each of the plurality of signals comprises a periodic sequence with a constant envelope.

4. The method of claim 1, wherein the location channel is overlaid onto a signal of a long term evolution network.

5. The method of claim 1, wherein each of the plurality of signals is extracted by each base station from the location channel.

6. The method of claim 1, wherein each base station of the plurality of base stations receives the plurality of signals from the wireless endpoint device via a plurality of paths.

7. The method of claim 6, wherein the plurality of paths comprises at least one direct path between each base station of the plurality of base stations and the wireless endpoint device.

8. The method of claim 7, wherein the direct path comprises a shortest path between each base station of the plurality of base stations and the wireless endpoint device.

9. The method of claim 6, wherein the plurality of paths comprises an indirect path between each base station of the plurality of base stations and the wireless endpoint device, wherein the indirect path comprises a path traversed by a signal that is reflected on a structure.

10. The method of claim 9, wherein the structure comprises a natural terrain.

11. The method of claim 9, wherein the structure comprises a man-made structure.

12. A tangible computer-readable medium storing a plurality of instructions which, when executed by a processor of a network element of a wireless network, cause the processor to perform operations for determining a location of a wireless endpoint device in the wireless network, the operations comprising:
   receiving from each of a plurality of base stations a plurality of signals and a plurality of times of arrival, wherein each of the plurality of times of arrival is associated with a particular signal of the plurality of signals, wherein each base station of the plurality of base stations is for receiving each of the plurality of signals from the wireless endpoint device via a location channel; and
   determining the location of the wireless endpoint device from the plurality of signals and the plurality of times of arrival.

13. The tangible computer-readable medium of claim 12, wherein the determining the location of the wireless endpoint device comprises:
   identifying a string of multipath components from the plurality of signals;
   determining which multipath component of the string of multipath components that are identified is associated with an earliest time of arrival of the plurality of times of arrival; and
   determining the location of the wireless endpoint device in accordance with the multipath component of the string of multipath components that is associated with the earliest time of arrival of the plurality of times of arrival.

14. The tangible computer-readable medium of claim 12, wherein each of the plurality of signals comprises a periodic sequence with a constant envelope.

15. The tangible computer-readable medium of claim 12, wherein the location channel is overlaid onto a signal of a long term evolution network.

16. The tangible computer-readable medium of claim 12, wherein each of the plurality of signals is extracted by each base station from the location channel.

17. The tangible computer-readable medium of claim 12, wherein each base station of the plurality of base stations receives the plurality of signals from the wireless endpoint device via a plurality of paths.

18. An apparatus of a wireless network for determining a location of a wireless endpoint device in the wireless network, comprising:
   a processor; and
   a computer-readable medium storing a plurality of instructions which, when executed by the processor, cause the processor to perform operations, the operations comprising:
      receiving from each of a plurality of base stations a plurality of signals and a plurality of times of arrival, wherein each of the plurality of times of arrival is associated with a particular signal of the plurality of signals, wherein each base station of the plurality of base stations is for receiving each of the plurality of signals from the wireless endpoint device via a location channel; and
      determining the location of the wireless endpoint device from the plurality of signals and the plurality of times of arrival.

* * * * *